United States Patent [19]
Dragoset, Jr.

[11] Patent Number: 5,946,271
[45] Date of Patent: Aug. 31, 1999

[54] CALIBRATION SYSTEM FOR USE IN TIME LAPSE TOMOGRAPHY

[75] Inventor: William Henry Dragoset, Jr., Houston, Tex.

[73] Assignee: Western Atlas International, Inc., Houston, Tex.

[21] Appl. No.: 08/822,299

[22] Filed: Mar. 21, 1997

[51] Int. Cl.⁶ .................................................. G01V 1/28
[52] U.S. Cl. .............................. 367/38; 367/48; 367/367; 367/47; 367/73; 367/38; 367/13; 367/25; 367/26; 367/37; 367/71
[58] Field of Search ................................ 367/48, 73, 13, 367/25, 26, 37, 71, 47

[56] References Cited

U.S. PATENT DOCUMENTS

| | | | |
|---|---|---|---|
| 4,479,204 | 10/1984 | Silverman | 367/37 |
| 4,969,130 | 11/1990 | Wason et al. | 367/46 |
| 5,461,594 | 10/1995 | Mougenot et al. | 367/48 |
| 5,586,082 | 12/1996 | Anderson et al. | 367/37 |
| 5,706,194 | 1/1998 | Neff et al. | 367/71 |

OTHER PUBLICATIONS

Ekofisk Field–Reservoir Characterization to Reservoir Monitoring on a Giant Chalk Reservoir (L040); S.C. Key, et al; Phillips Petroleum Co., Norway, Eage 58th Conference and Technical Exhibition, Amsterdam, Jun. 3–7, 1996; s. 2 pages.

Primary Examiner—John Barlow
Assistant Examiner—Anthony Jolly
Attorney, Agent, or Firm—Madan & Morris, P.C.

[57] ABSTRACT

A discrete, minimally-equipped standard seismic calibration system is permanently installed over a subsurface reservoir structure that contains fluids of economic interest. Changes in the fluid content as a function of long-term time lapse may introduce changes in the acoustical characteristics of the reservoir rock layers, producing a corresponding change in the seismic signature recorded by the calibration system. The difference between two signatures over a selected time epoch defines a time-lapse calibration signature. The time lapse calibration signature can be applied to reduce the results of different conventional seismic data-acquisition systems of different vintages and technologies to a common standard.

7 Claims, 3 Drawing Sheets

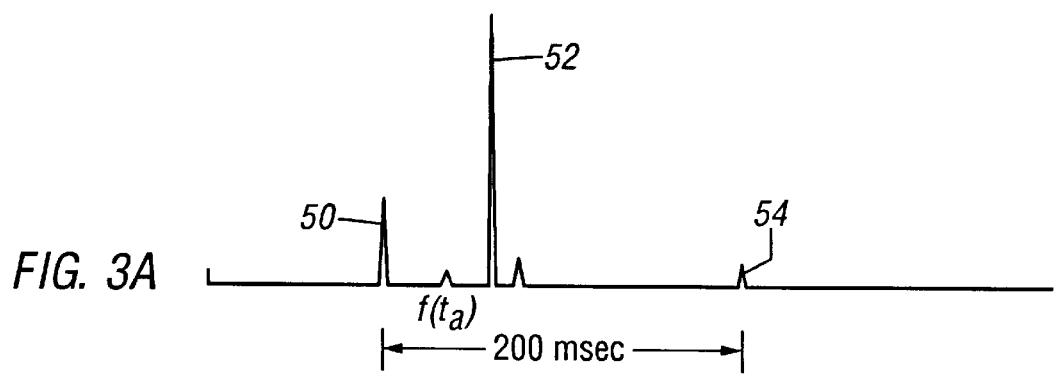
FIG. 3A
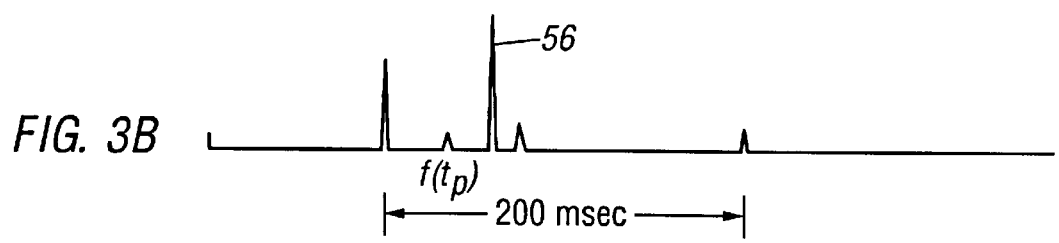
FIG. 3B
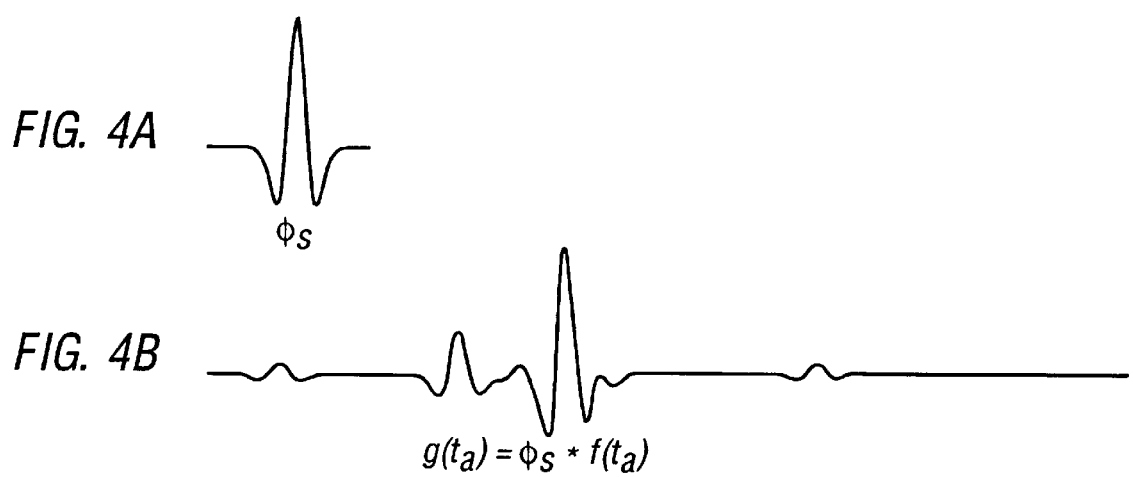
FIG. 4A
FIG. 4B
FIG. 4C
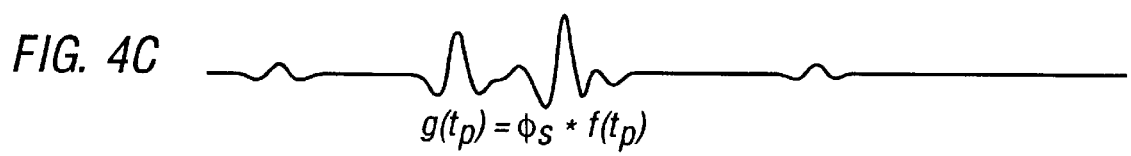
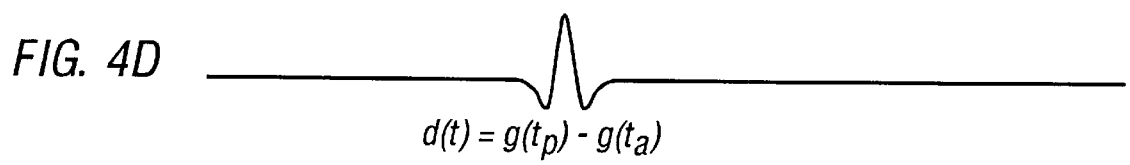
FIG. 4D $\psi_S$ $h(t_a) = \psi_S * f(t_a)$ $\xi_S$ $\ell(t_p) = \xi_S * f(t_p)$ $\delta(t) = \ell(t_p) - h(t_a)$ $T(t)$ $\Delta(t) = \delta(t) * T(t) \equiv d(t)$

CALIBRATION SYSTEM FOR USE IN TIME LAPSE TOMOGRAPHY

BACKGROUND OF THE INVENTION

1. Field of the Invention

This invention is concerned with monitoring the long-term changes in the distribution of the fluid content of a reservoir formed in a permeable subsurface rock formation. Changes in the fluid distribution give rise to concomitant changes is the acoustic signature of the reflected seismic signals that illuminated the reservoir rocks. Meaningful quantitative results require use of calibrated instrumentation.

2. Discussion of Related Art

As is well known to geophysicists a sound source, at or near the surface of the earth, is caused periodically to inject an acoustic wavefield into the earth at each of a plurality of regularly-spaced survey stations. The wavefield radiates in all directions to insonify the subsurface earth formations whence it is reflected back to be received by seismic sensors located at designated stations at or near the surface of the earth. The seismic sensors convert the mechanical earth motions, due to the reflected wavefield, to electrical signals. The resulting electrical signals are transmitted over a signal-transmission link of any desired type, to instrumentation, usually digital, where the seismic data signals are archivally stored for later processing. The travel-time lapse between the emission of a wavefield by a source and its reception by a receiver after reflection, is a measure of the depths of the respective reflecting earth formations.

The seismic survey stations are preferably distributed in a regular grid over an area of interest with inter-station spacings on the order of 25 meters. The processed seismic data associated with a single receiver are customarily presented as a one-dimensional time scale recording displaying rock layer reflection amplitudes as a function of two-way wavefield travel time. A plurality of seismic traces from a plurality of receivers sequentially distributed along a line of survey may be formatted side-by-side to form an analog of a cross section of the earth (two-dimensional tomography). Seismic sections from a plurality of intersecting lines of survey distributed over an area of interest would provide three-dimensional tomography.

The term "signature" used herein means the variations in amplitude and phase of an acoustic wavelet (for example, a Ricker wavelet) expressed in the time domain as displayed on a time scale recording. The impulse response means the response of the instrumentation to a spike-like Dirac function.

Wavefield reflection from a subsurface interface depends on the acoustic characteristics of the rock layers that define that interface such as density and wavefield propagation velocity. In turn those characteristics depend inter alia on the rock type, rock permeability and porosity, fluid content and fluid composition. In a subsurface reservoir, the fluid phase change from gas to oil or water may act as a weak reflecting surface to generate the so-called bright spots sometimes seen on seismic cross sections. It is reasonable to expect that a change in the level or the characteristics of the reservoir fluids will create a change in the seismic signature associated with the reservoir. Thus, time-lapse or 4-D tomography, that is, the act of monitoring the regional seismic signature of a reservoir over a long period of time would assist in tracking the depletion of the reservoir or the advance of thermal front in a steam-flooding operation.

The dimension of time as discussed in this disclosure may be expressed in two very different orders of magnitude. Wavefield travel times and discrete data-sample times are dimensionally resolved to seconds and thousandths thereof. In the realm of time-lapse tomography, the petrophysicist is concerned with changes in the seismic signature changes as seen on data sets that are separated in time by many months or years. To avoid ambiguity, the time lapse between long-term reservoir monitoring studies will be referred to as an epoch as opposed to the short-term (data) sample intervals or (wavefield) travel times.

Successful time-lapse monitoring requires that differences among the processed 3-D data sets must be attributable solely to physical changes in the petrophysical characteristics of the reservoir. That criterion is severe because changes in the data-acquisition equipment and changes in the processing algorithms, inevitable over many years, introduce differences among the separate surveys. Long-term environmental changes in field conditions such as weather and culture affect the outcome. If time-lapse tomography is to be useful for quantitative reservoir monitoring, instrumental and environmental influences that are not due to changes in reservoir characteristics must be transparent to the before-and-after seismic data sets. Successful time-lapse tomography requires careful preliminary planning.

One worker in the art studying reservoir steam flooding, found that certain reflections originating from strata above the reservoir were very repeatable over time. Therefore, it was reasoned, any changes in the signature of the reservoir rocks, absent concomitant changes in shallow reflecting horizons, were indeed indicative of physical changes in reservoir-rock parameters. In effect that technique is a type of self-calibrating method. That method is useful only in a geological domain where a reliable, homogeneous shallow reflecting horizon happens to be available.

U.S. Pat. No. 4,969,130 issued Nov. 6, 1990 to Cameron D. Wason et al. teaches a SYSTEM FOR MONITORING CHANGES IN FLUID CONTENT OF A PETROLEUM RESERVOIR. This is a system of monitoring the fluid contents of a petroleum reservoir, wherein a synthetic reservoir model is employed to predict the fluid flow in the reservoir. Included, is a check on the reservoir model by comparison of synthetic seismograms with the observed seismic data. If the synthetic output predicted by the model agrees with the observed seismic data, then it is assumed that the reservoir is being properly worked. If not, then the reservoir model, in particular the reservoir description, is updated until it predicts the observed seismic response. The seismic survey may be periodically repeated during the productive life of the reservoir and the technique used to update the reservoir model so as to ensure that the revised reservoir description predicts the observed changes to the seismic data and hence reflects the current status of fluid saturations.

The difficulty with the Wason reference is the need to generate a synthetic model of the reservoir after some period of elapsed time. The ultimate desideratum of time-lapse reservoir monitoring is to construct a reservoir model based upon hard data from seismic measurements after the reservoir characteristics have undergone imperfectly-known physical changes. Because those changes are imperfectly known, it is difficult to guess what the reservoir characteristics might look like a year or so later in order to create a hypothetical synthetic model for comparison purposes.

U.S. Pat. No. 5,461,594 issued Oct. 24, 1995 to Denis Mougenot et al. for a METHOD OF ACQUIRING AND PROCESSING SEISMIC DATA RECORDED ON RECEIVERS DISPOSED VERTICALLY IN THE EARTH TO MONITOR THE DISPLACEMENT OF FLUIDS IN A RESERVOIR, according to the Abstract, teaches a method of acquiring and processing seismic data for the repetitive monitoring of displacement of fluids impregnating a reservoir deep in the subsurface below the surface weathering zone comprises the steps of making at each point on a predetermined grid on the surface a vertical axis shallow borehole in the earth above the reservoir passing through the weathered layer, positioning in each borehole along its vertical axis a plurality of fixed receivers adapted to be connected separately to the seismic recorder on the surface, emitting near each borehole seismic waves into the earth by means of an emitter on the surface or close by the surface near the vertical axis of the borehole, recording for each borehole by means of receivers placed in the borehole to direct incident seismic waves and the seismic waves reflected at the interfaces of the deep strata of the subsurface, each receiver providing a separate record of an incident wave and a plurality of reflected waves, and carrying out the following process steps for each borehole: picking the first break of direct incident waves, horizontalizing the reflected waves, separating the reflected waves and the direct incident waves, deconvolving receiver by receiver the reflected waves by the direct incident wave in order to obtain a zero-phase trace for each receiver and stacking the zero-phase traces from the receivers to obtain a low coverage/zero-offset, zero-phase trace. This patent was concerned with a land system but its teachings could be extended to a marine system by installing the sensors in boreholes or crypts on the sea floor.

The inventors of the '594 patent recognize the need for maintaining identical instrumentation and processing methods throughout the reservoir-monitoring epoch. Therefore, sensors are permanently sealed in a plurality of boreholes distributed over the area of interest. A standard source and standard processing methods are used to maintain constant data-gathering/interpretation conditions throughout the monitoring epoch. The method avoids the guess-work of the '130 reference. But to monitor properly a reservoir of large areal extent, many hundreds or thousands of densely-distributed borehole-emplaced sensors would be needed, a very uneconomical installation indeed, which renders that method to not be very practical.

There is a need for a compact, minimally-equipped, permanently-installed, localized seismic calibration system that provides standardized seismic measurements throughout extended reservoir-monitoring epochs. Data output from the standard system is used for calibrating the seismic outputs of a conventional areally-distributed seismic system of whatever type that happens to be currently in favor at the time a detailed monitoring survey is undertaken during the epoch.

SUMMARY OF THE INVENTION

This is a method for monitoring changes in the acoustical characteristics of a subsurface geologic reservoir due to changes in the fluid content of said reservoir over an epochal time lapse. At least one discrete localized acoustic calibration system, having a known impulse response, is installed permanently within a region associated with the reservoir. Using said localized acoustic calibration system, a first acoustic signature is measured that is characteristic of said reservoir at a first time epoch. The calibration system is again used to measure a second subsequent acoustic signature characteristic of said reservoir at a second time epoch. The difference between the first and second acoustic signatures defines a time lapse calibration signature. A third acoustic signature characteristic of said reservoir is measured at said first time epoch using a first conventional distributed seismic data acquisition system, including a plurality of spatially distributed seismic data-sampling stations, the first distributed seismic data acquisition system having an unknown impulse response. A fourth acoustic signature characteristic of said reservoir at said second time epoch is measured using a second distributed seismic data acquisition system including a plurality of spatially distributed seismic data-sampling stations, the second distributed seismic data acquisition system likewise having an unknown impulse response. A raw time-lapse signature is determined from the difference between said measured third and fourth acoustic signatures. The calibrated time-lapse signature is substantially simulated at each data-sampling station by filtering the corresponding raw time-lapse signature. Changes in the acoustical characteristics of said reservoir, as a function of epochal time are estimated from analysis of the waveform of the filtered time-lapse signature in comparison to the known impulse response of the calibration signature.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 3A is the reflectivity series of reservoir rocks, $f(t_a)$, ante production;

FIG. 3B is the reflectivity series of the reservoir rocks, $f(t_p)$, post production;

FIG. 4A is the known impulse response of the calibration system;

FIGS. 4B and 4C are the respective seismic signatures of the reservoir rocks resulting from convolution of the traces of FIGS. 3A and 3B with the trace of FIG. 4A;

FIG. 4D is the difference between traces 4B and 4C, defining a calibration signature;

DETAILED DESCRIPTION OF THE PREFERRED EMBODIMENT

Figure 1:
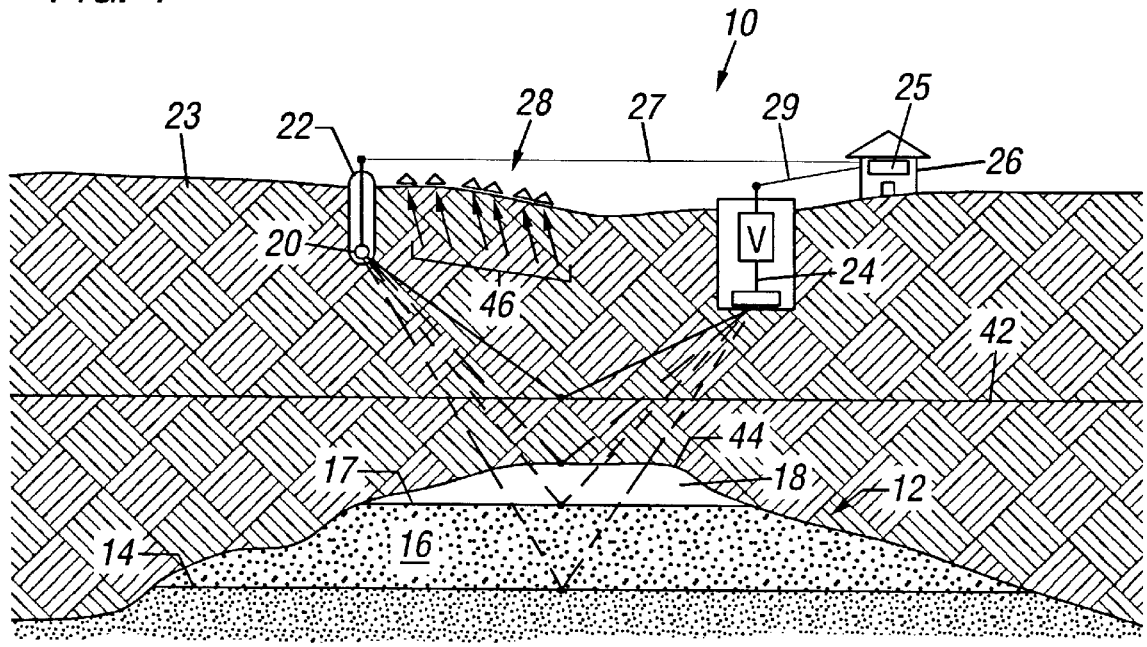
FIG. 1 is a schematic cross sectional view of a seismic calibration system installed over a reservoir accompanied by a conventional seismic survey layout.

FIG. 1 is a schematic cross-sectional view of a calibration system, generally shown as 10 installed over a subsurface geologic reservoir 12 that contains fluids defining an interface 14 between a salt-water layer and oil-saturated rocks 16 and an interface 17 between the oil-saturated rocks 16 a gas cap 18. Calibration system 10 consists of at least one discrete standard localized seismic sensor such as 20 which is permanently sealed in a borehole or crypt, such as 22, beneath the surface 23 of the earth for protection and archival preservation. A standard seismic source such as 24, which may be a vibrator or an air gun of any preferred type, that also may be permanently preserved for posterity is provided. Seismic data signals from the standard sensors are gathered periodically and are fed to data-processing equipment 25 installed in instrumentation hut 26 via transmission line 27. Source 24 is triggered via line 29 upon command from data processing equipment module 25

A conventional seismic system, generally shown as 28, of any desired type, consists of a plurality of surface-disposed seismic sensors such as indicated by the small triangles and one or more seismic sources (not shown in FIG. 1) is used to define the details of the structure of the reservoir rocks in the usual manner familiar to exploration geophysicists.

In FIG. 1, a single calibration sensor and a single calibration source are installed over the reservoir and which are considered adequate in cases of relatively simple reservoir structure. Several such calibration sensors and sources may be used if the regional complexity of the reservoir rocks so demands. The calibration data from more than one calibration-sensor installation, if used, could be averaged or the results could be applied individually as desired.

Figure 2:
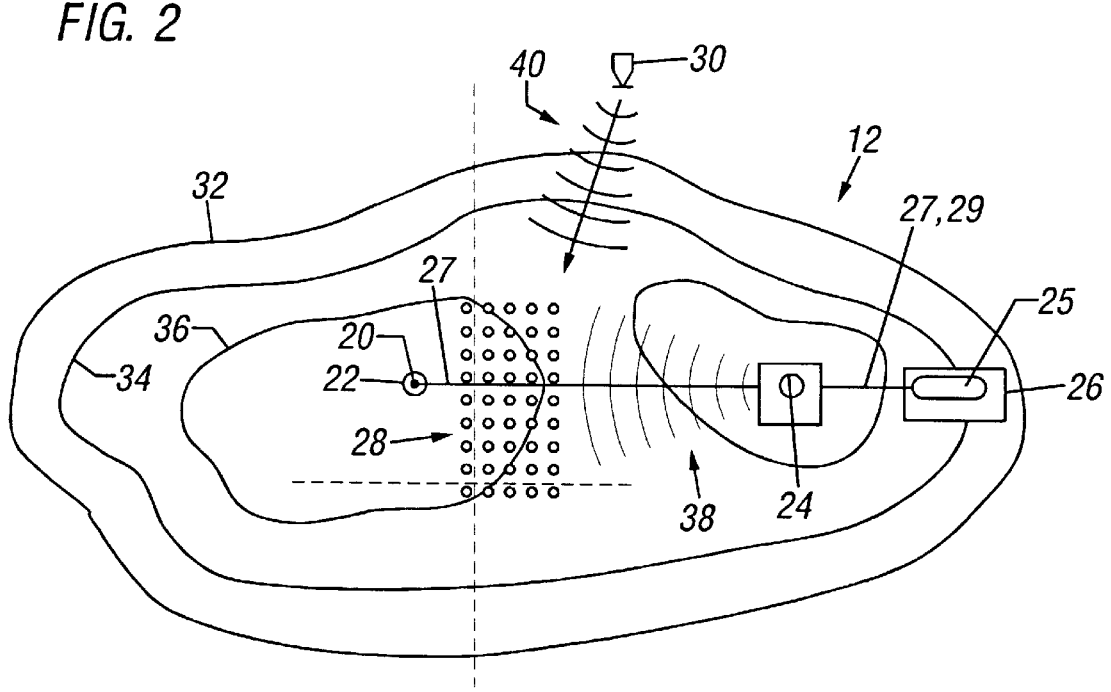
FIG. 2 is a plan view of FIG. 1
Figure 5A:
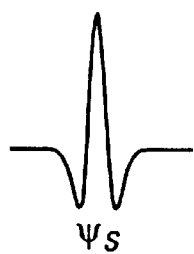
FIG. 5A is the postulated but unknown impulse response of a first seismic system.
Figure 5B:
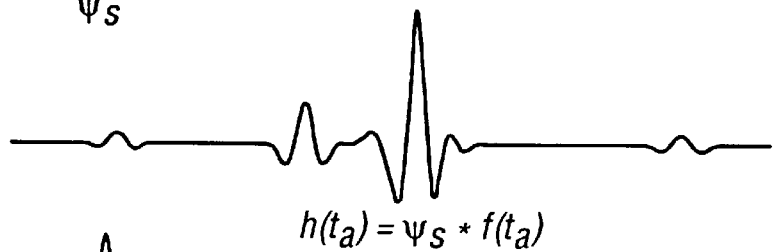
FIG. 5B is the convolution of 3A and 5A.
Figure 5C:
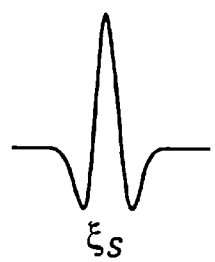
FIG. 5C is the postulated but unknown impulse response of a second seismic system.
Figure 5D:
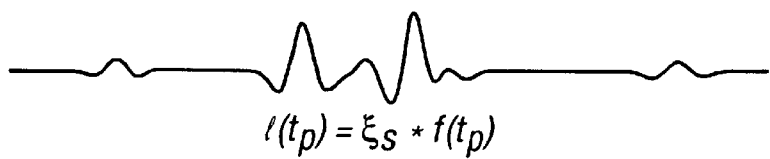
FIG. 5D is the convolution of trace 3B with trace 5C.
Figure 5E:
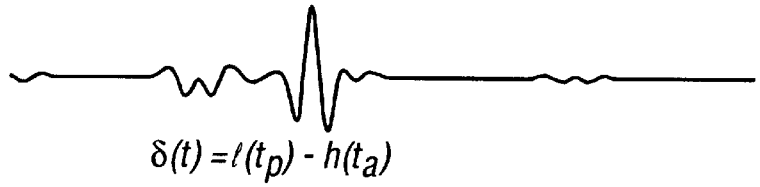
FIG. 5E is the difference between traces 5B and 5D, defining a raw time-lapse signature.
Figure 6A:
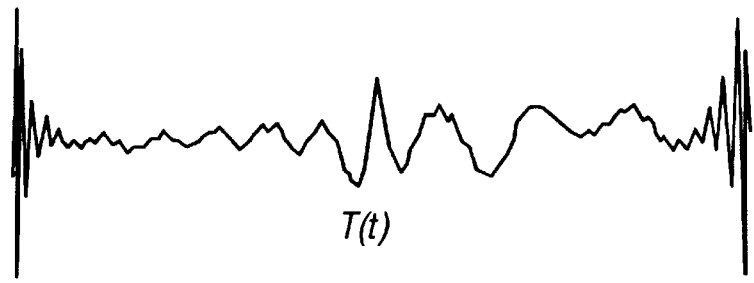
FIG. 6A is a system calibration filter.
Figure 6B:
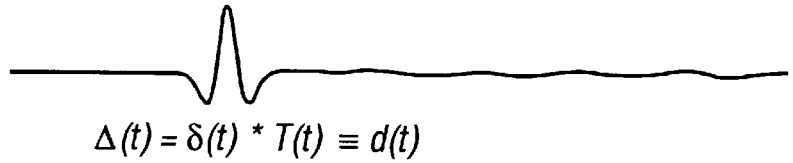
FIG. 6B is the convolution of traces 5E and 6A.

FIG. 2 is a plan view of the calibration system installation with the same reference characters referring to the same items in both drawing figures. The contours 32, 34, 36 are intended to outline the structure of the subsurface reservoir rocks. The localized calibration standard sensor 20 is shown along with standard source 24 and instrumentation hut 26. Conventional, distributed seismic data acquisition system 28 is shown as a small patch of sensors near calibration sensor crypt 22. In actual practice, the conventional seismic sensors are spatially distributed over the entire region encompassed by reservoir 12 as suggested by the intersecting dashed lines drawn through the west and south borders of the patch. The sensors are spaced on a regular grid pattern 25–50 meters per side as is well known.

Calibration sensor 20 is insonified by reflected wavefields 38 emanating from standard source 24. Conventional, distributed seismic data acquisition system 28 is insonified by wavefields 40 issuing from one or more conventional sources such as 30. Those operations are conducted independently of one another.

Referring back to FIG. 1, in operation, excitation of standard source 24 (shown as a vibrator) generates a wavefield such as 38, FIG. 2, that is reflected from a shallow interface 42 (solid lines), the upper boundary 44 of reservoir 12 (long dashes), gas/oil interface 17 (short dashes) and oil/salt-water interface 14 (long/short dashes). Ray bundle 46 represents reflections from the respective interfaces following ray trajectories between conventional source 30 and sensor patch 28. The complete travel paths are not shown to avoid unduly complicating the drawings.

The purpose of this invention as earlier stated is to examine the seismic signature of reservoir rocks before and after a resource-exploitation epoch. The presently-preferred best mode of practicing this invention is most easily explained by means of a series of illustrative waveforms which form a pictorial flow diagram of the preferred process.

FIG. 3A is a series of spikes or Dirac functions representing a hypothetical ante-production reflectivity series, $f(t_a)$, of the reservoir rocks to a seismic measurement over a preselected time window. The time window, in this example 0.200 second, is chosen to bracket the reservoir interval. In trace 3A, spike 50 might represent a reflection from stratum 42, FIG. 1, high amplitude spike 52 originates from gas/oil interface 17, spike 54 originates from oil/water interface 14.

Trace 3B represents the post-production reflectivity series, $f(t_p)$ of the reservoir rocks after some extended time period such as a year or more. The amplitude of the gas/oil spike 52 of trace 3A has substantially diminished because of the change in the acoustic impedance of the reservoir rocks such as may have been wrought by production.

The calibration system includes standard sensor 20, standard source 24 and processing module 25 which is preferably digital and which is endowed with a standard processing program. The impulse response, $\phi_s$, of the system is shown in trace 4A. Trace 4B, $g(t_a)$, a first acoustic signature of the reservoir rocks ante production, is trace 3A convolved with trace 4A in accordance with $$g(t_a)=\phi_s{}^*f(t_a).$$

Trace 4C, $g(t_p)$, is trace 3B convolved with 4A:

$$g(t_p)=\phi_s{}^*f(t_p),$$

which is a second, post-production, acoustic signature of the reservoir rocks. Trace 4D, d(t), is the difference between traces 4B and 4C, or $[g(t_p)-g(t_a)]$, defined as the calibration signature, which represents the change in the acoustic signature of the reservoir due to fluid depletion. Given knowledge of the parameters that control the shape of the impulse response transient of 4A, useful information may be gleaned about reservoir properties as a function of elapsed time.

As earlier explained, the calibration system installation consists of one or perhaps a few members but not enough to make a detailed survey of the area. That operation is done by the use of conventional seismic survey operations using whatever type of instrumentation happens to be popular at the time. A later seismic system is likely to be considerably more advanced technically than an earlier system. Because the system impulse responses of the two systems are different and, perhaps even unknown, the acoustic signature of the reservoir rocks cannot be validly compared without proper calibration as will next be disclosed.

Let it be supposed that the impulse response, $\psi_s$ of a first full-scale, non-permanent data acquisition system is represented by trace 5A. The resulting reservoir-rock seismic signature ante production is 5A convolved with 3A or $$h(t_a)=\psi_s{}^*f(t_a)$$

as shown at 5B which defines a third acoustic signature. Let it be further supposed that, at a later time post production, the region is surveyed using a system having an impulse response $\xi_s$, trace 5C. The resulting fourth acoustic signature is $$l(t_p)=\xi_s{}^*f(t_p),$$

trace 5D. The difference, $\delta(t)=l(t_p)-h(t_a)$ is shown at trace 5E, the raw time-lapse signature.

Comparison between trace 4D and 5E shows that the reservoir signature change as measured by the full-scale seismic data acquisition systems is distorted because the two systems are not identical. The distortion can be corrected by seeking a convolutional operator that reduces the distorted raw time-lapse signature $\delta(t)$ to the true difference signature d(t).

Trace 6A is the calibration operator, T(t) which, when applied to $\delta(t)$ trace 5E, the raw time-lapse signature, simulates d(t) (as shown in trace 6B), the calibrated signature as previously shown at trace 4D. The calibration operator T(t) may be determined from the well-known Wiener-Hopf equation formatted as a discrete summation for digitally-sampled data signals:

$$\phi_{\delta d} = \sum_{-N}^{N} T(t)\phi_{\delta\delta}(\tau - t)dt, \tau > 0$$

where
  $\tau$=sample values over the desired time window, $-N \leq \tau \leq N$;
  T(t)=sought-for filter;
  $\phi_{\delta d}$=cross correlation function, traces 5E and 4D;
  $\phi_{\delta\delta}$=auto correlation function, trace 5E.
For each value of $\tau$, we get a linear equation involving the filter coefficients, T(t), and the autocorrelation samples $\phi_{\delta\delta}$. A set of linear equations results that can be cast in the form of a matrix, $\underline{\Phi}_{\delta d}$, as is well known. The matrix may be solved for the unknown filter operator T(t):

$$T(t) = \Phi_{\delta\delta} \cdot (\underline{\Phi}_{\delta d})^{-1},$$

using any well-known technique such as the Levinson-Wiener algorithm.

Using the system-calibration method, a simple, economical standard acoustic-parameter monitoring system can be installed permanently over a region of interest. Over the years, the reservoir characteristics periodically can be studied in detail using whatever conventional state-of-the-art seismic data acquisition system that happens to be available at the time. The calibration process insures that the before-and-after data can be compared validly. Since the impulse response of the calibration system is known, changes over time of selected acoustical characteristics, such as but not limited to acoustic velocity, of the reservoir rocks, can be validly estimated.

This disclosure has been illustrated as being equipped with a single localized standard calibration system by way of example but not by way of limitation. In complex regions, more than one calibration system could be installed (not shown to avoid over-complicating the Figures). Each local calibration system would be ancillary to and used in conjunction with an associated nest of conventional distributed seismic data acquisition sensors and sources. Any desired combination of averaged or unaveraged data comparisons may be used.

This invention has been described with a certain degree of specificity by way of example but not by way of limitation. Those skilled in the art will devise obvious variations to the examples given herein but which will fall within the scope and spirit of this invention which is limited only by the appended claims.

What is claimed is:
1. A method for monitoring changes in the acoustical characteristics of a subsurface geologic reservoir as displayed within a preselected seismic reflection travel-time window, the changes being due to variations in the fluid distribution within said reservoir as a function of epochal time lapse, comprising:
  a) installing at least one discrete localized acoustic calibration system, having a known impulse response, within a region associated with said reservoir;
  b) using said localized acoustic calibration system, measuring a first acoustic signature characteristic of said reservoir at a first time epoch;
  c) using said calibration system, measuring a second acoustic signature characteristic of said reservoir at a second time epoch;
  d) defining a time-lapse calibration signature from the difference between said first and second acoustic signatures as measured within said preselected travel time window;
  e) measuring a third acoustic signature characteristic of said reservoir at said first time epoch using a first distributed seismic data acquisition system, including a plurality of spatially distributed seismic data-sampling stations, said system having an unknown impulse response;
  f) measuring a fourth acoustic signature characteristic of said reservoir at said second time epoch using a second distributed seismic data acquisition system including a plurality of spatially distributed seismic data-sampling stations, the system having an unknown impulse response;
  g) defining a raw time-lapse signature from the difference between said measured third and fourth acoustic signatures;
  h) substantially simulating said calibrated time-lapse signature by filtering the raw time lapse signature;
  i) estimating changes in the acoustical characteristics of said reservoir, as a function of epochal time, from analysis of the waveform of the filtered time-lapse signature in comparison to the known impulse response of the calibration signature.

2. The method as defined by claim 1, comprising:
installing a plurality of discrete localized calibration systems within said region, each calibration system being ancillary to a nest of spatially-distributed seismic data-sampling stations;
executing steps b) through f);
defining a raw time-lapse signature, at each said spatially-distributed seismic data-sampling station, from the differences between the respective measured third and fourth acoustic signatures as derived from substantially co-located sampling stations;
substantially simulating the calibration signature defined by the corresponding ancillary calibration system by filtering the raw time-lapse signatures derived from said nest of sampling stations;
estimating local changes in the acoustical characteristics of said reservoir as a function of epochal time from analysis of the waveforms of the filtered time lapse signatures in comparison to the known impulse response the ancillary calibration system.

3. The method as defined by claim 2, wherein:
the raw time lapse signatures from any one nest of spatially-distributed sampling stations are averaged before the step of filtering.

4. The method as defined by claim 2, wherein:
the calibrated time lapse signatures from a plurality of ancillary calibration systems are averaged and the individual raw time lapse signatures from each spatially distributed seismic data-sampling point are filtered to simulate the averaged calibration time-lapse signature.

5. A method for monitoring changes in the acoustical characteristics of a subsurface geologic reservoir due to variations in the acoustical characteristics of said reservoir as a function of epochal time lapse, comprising:
  a) installing at least one discrete localized acoustic calibration system, having a known impulse response, within a region associated with said reservoir;

b) using said localized acoustic calibration system, measuring a first acoustic signature characteristic of said reservoir at a first time epoch;

c) using said calibration system, measuring a second acoustic signature characteristic of said reservoir at a second time epoch;

d) defining a time-lapse calibration signature from the difference between said first and second acoustic signatures;

e) measuring a third acoustic signature characteristic of said reservoir at said first time epoch using a first distributed seismic data acquisition system, including a plurality of spatially distributed seismic data-sampling stations, said system having an unknown impulse response;

f) measuring a fourth acoustic signature characteristic of said reservoir at said second time epoch using a second distributed seismic data acquisition system including a plurality of spatially distributed seismic data-sampling stations, the system having an unknown impulse response;

g) defining a raw time-lapse signature from the difference between said measured third and fourth acoustic signatures;

h) substantially matching the raw time lapse signature to said calibrated time-lapse signature by filtering the raw time lapse signature;

i) estimating changes, over epochal time, in the acoustical characteristics of said reservoir from analysis of the waveform of the filtered time-lapse signature.

6. The method as defined by claim 5, comprising:

installing a plurality of discrete localized calibration systems within said region, each calibration system being ancillary to a nest of spatially-distributed seismic data-sampling stations;

executing steps b) through f);

defining a raw time-lapse signature, at each said spatially-distributed seismic data-sampling station, from the differences between the respective measured third and fourth acoustic signatures as derived from substantially co-located sampling stations;

substantially matching the calibration signature defined by the corresponding ancillary calibration system by filtering the raw time-lapse signatures derived from the corresponding nest of sampling stations;

estimating local changes in the acoustical characteristics of said reservoir as a function of epochal time from analysis of the waveforms of the filtered time lapse signatures.

7. A method for monitoring changes in the acoustical characteristics of a subsurface geologic reservoir as a function of epochal time lapse, comprising:

(a) using at least one discrete localized acoustic calibration system installed at a location responsive to acoustic signals reflected from said reservoir, said calibration system having a known impulse response, to measure a first acoustic signature characteristic of said reservoir at a first time epoch and a second acoustic signature characteristic of said reservoir at a second time epoch;

(b) defining a time-lapse calibration signature from the differences between said first and second acoustic signatures;

(c) using a first distributed seismic data system including a plurality of spatially distributed seismic data-sampling stations having an unknown impulse response for measuring a third acoustic signature characteristic of said reservoir at said first time epoch;

(d) using a second distributed seismic data system including a plurality of spatially distributed seismic data-sampling stations having an unknown impulse response for measuring a fourth acoustic signature characteristic of said reservoir at said second time epoch;

(e) defining a raw time-lapse signature from the difference between said measured third and fourth acoustic signatures;

(f) substantially matching the raw time lapse signature to said calibrated time-lapse signature by filtering the raw time lapse signature;

(g) estimating changes, over epochal time, in the acoustical characteristics of said reservoir from analysis of the waveform of the filtered time-lapse signature.

* * * * *